(12) United States Patent  (10) Patent No.: US 8,061,880 B2
Lambert et al.  (45) Date of Patent: Nov. 22, 2011

(54) HIGH EFFICIENCY LIGHT PIPE—H.E.L.P.

(75) Inventors: Chad D. Lambert, Belleville (CA);
Ronald O. Woodward, Yorktown, VA (US)

(73) Assignee: Magna International Inc., Aurora (CA)

( * ) Notice: Subject to any disclaimer, the term of this patent is extended or adjusted under 35 U.S.C. 154(b) by 381 days.

(21) Appl. No.: 12/229,396

(22) Filed: Aug. 22, 2008

(65) Prior Publication Data

US 2010/0046242 A1   Feb. 25, 2010

(51) Int. Cl.
*F21V 5/00* (2006.01)
*B60Q 1/04* (2006.01)

(52) U.S. Cl. .................. 362/511; 362/522; 362/545

(58) Field of Classification Search .................. 362/555, 362/558, 507, 511, 522, 540, 545, 547
See application file for complete search history.

(56) References Cited

U.S. PATENT DOCUMENTS

| 7,270,454 | B2 * | 9/2007 | Amano ........................... 362/522 |
| 7,651,246 | B2 * | 1/2010 | Bollea et al. ................... 362/329 |
| 2003/0202241 | A1 * | 10/2003 | Blumel .......................... 359/365 |
| 2004/0264189 | A1 * | 12/2004 | Shu et al. ....................... 362/257 |
| 2005/0180155 | A1 * | 8/2005 | Suzuki et al. .................. 362/520 |
| 2008/0239743 | A1 * | 10/2008 | McFadden et al. ............ 362/512 |
| 2008/0304277 | A1 * | 12/2008 | Chinniah et al. .............. 362/507 |

\* cited by examiner

*Primary Examiner* — Jong-Suk (James) Lee
*Assistant Examiner* — Peggy A. Neils
(74) *Attorney, Agent, or Firm* — Warn Partners, P.C.; Marc Luddy

(57) ABSTRACT

A headlamp assembly which includes an optic used for providing a turn signal which meets the government requirements for luminous intensity when the turn signal is located near or next to the headlamp assembly. The present invention is a headlamp assembly which includes a housing, at least one optic disposed within the housing, as well as at least one light source which is operable with the optic such that light is emitted from the optic which meets or exceeds present regulatory requirements. The present invention also includes an outer lens mounted on the housing such that light emitted from the optic passes through the outer lens.

21 Claims, 4 Drawing Sheets

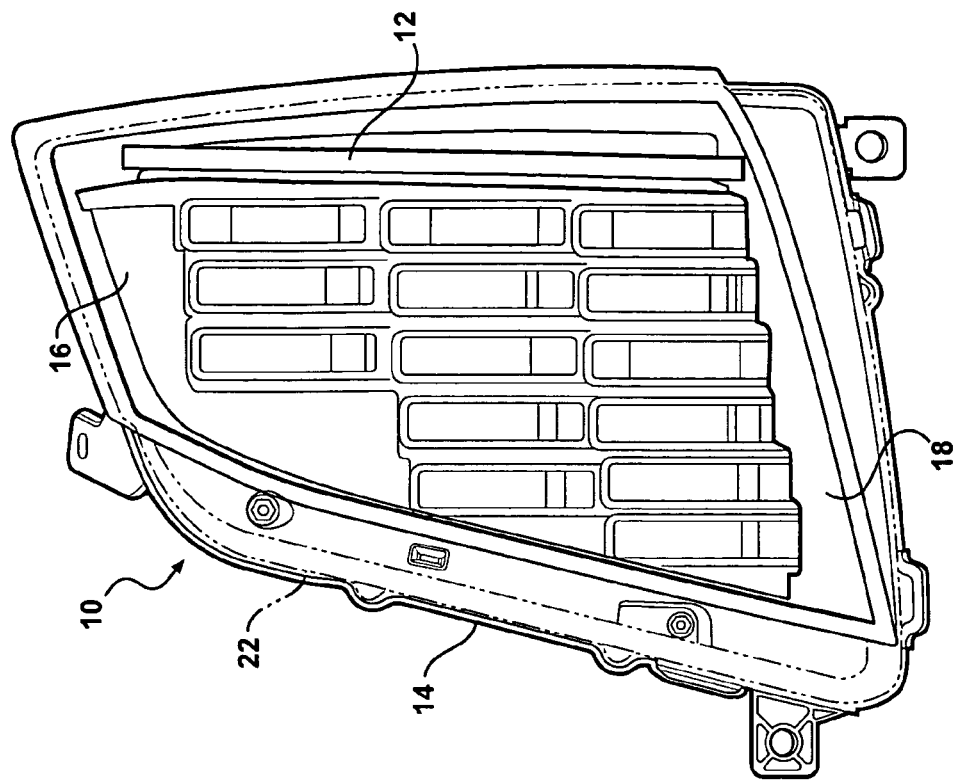
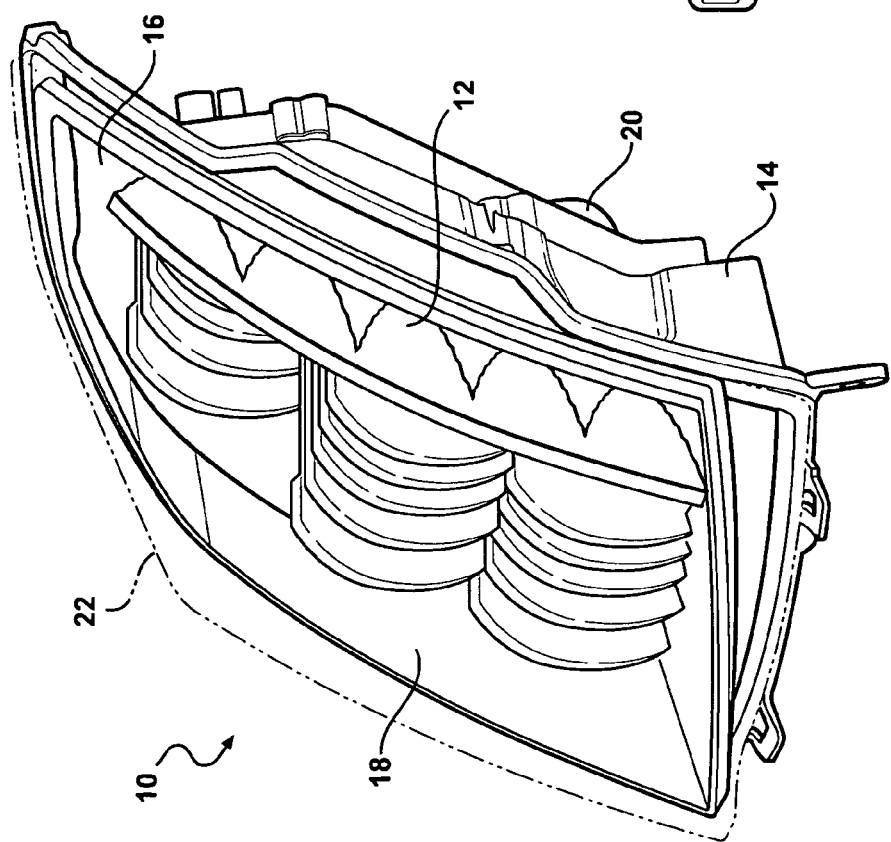

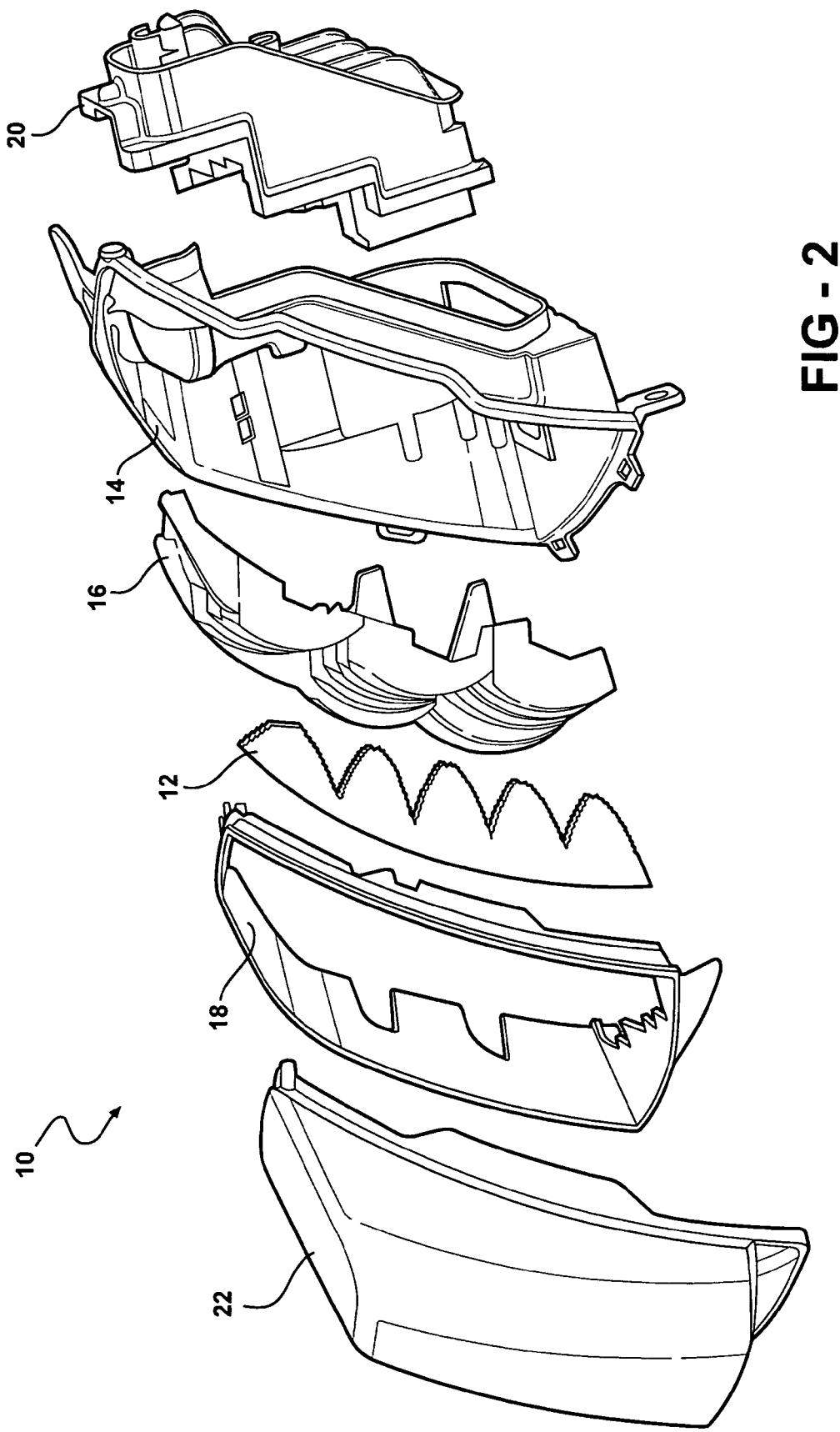

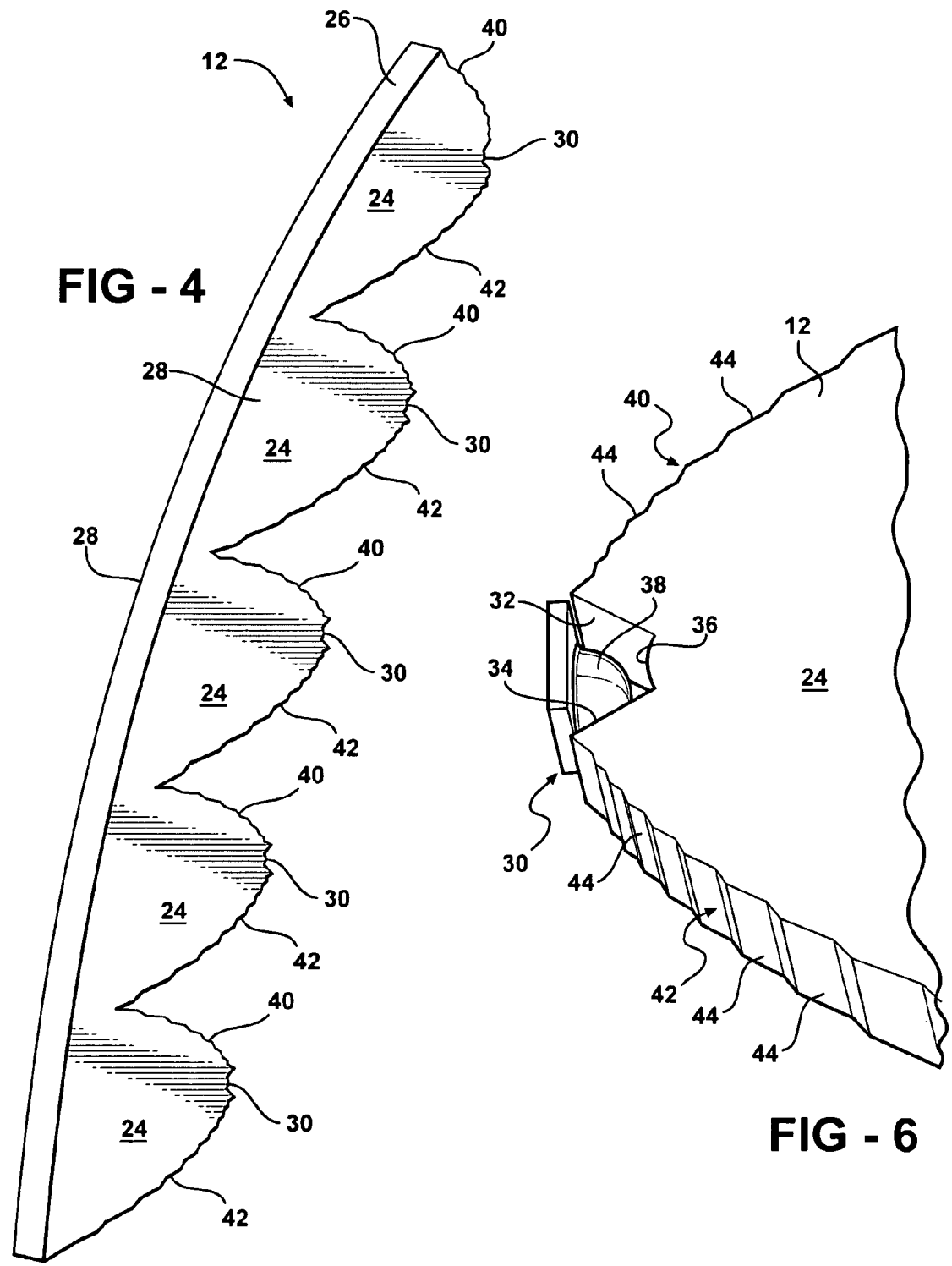

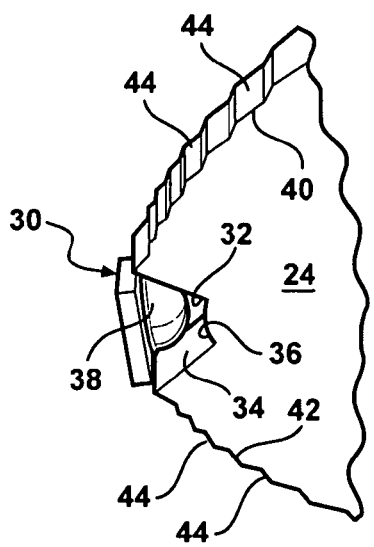
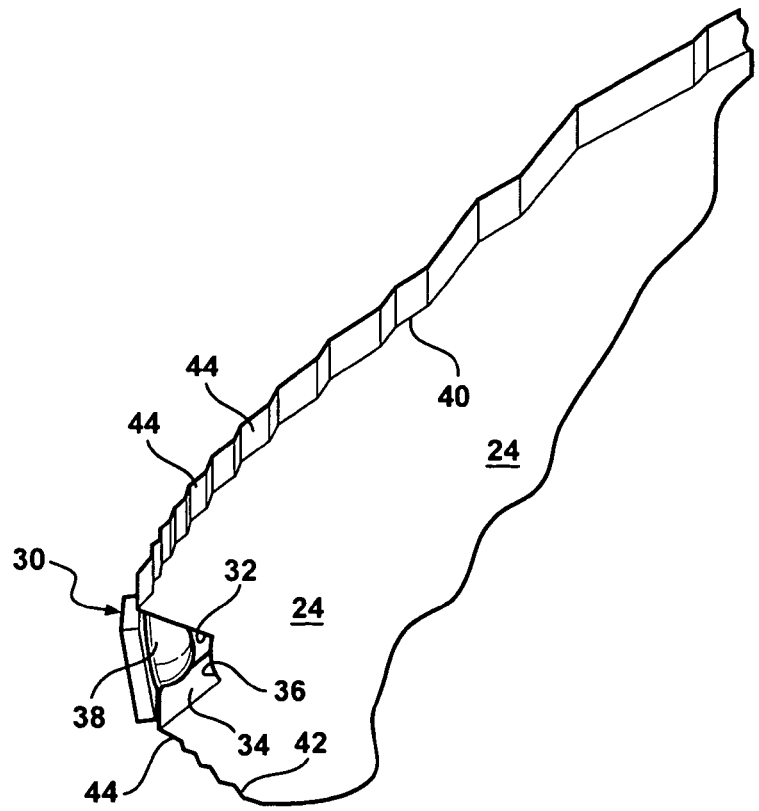
FIG - 5

HIGH EFFICIENCY LIGHT PIPE—H.E.L.P.

FIELD OF THE INVENTION

The present invention relates to optics used for turn signals in a headlamp assembly of an automobile.

BACKGROUND OF THE INVENTION

Turn signals used in headlamp assemblies for automobiles are generally known. Turn signals are often used for providing an indication to other drivers that a vehicle is going to turn either left or right. Typically, there is also more than one turn signal on the automobile, usually there is at least one turn signal for providing an indication to other drivers located to the side of the vehicle that the driver is turning, as well as other turn signals for giving an indication to drivers located at the front and rear of the vehicle that the driver is turning. There are typically turn signals at the rear of the vehicle, towards the front of the vehicle, and on the sides of the vehicle. With some modern vehicles, turn signals have also been incorporated into the side mirrors.

There are various government regulations which provide standards which are used in the construction of headlamps and turn signals to have a minimum level of brightness, as well as a specified direction in which the light produced by the headlamps and turn signals must be directed. Some of these standards relate to the position of a turn signal in relation to a headlamp assembly. More specifically, in the case where the front turn signal is mounted in close proximity to the low beam headlamp, or in close proximity to any additional lamp used to supplement or in lieu of the low beam, such as an auxiliary low beam or fog lamp, the light produced by the turn signal must be two-and-a-half times the normal required amount of luminous intensity. The current minimum requirement for the functional lighted lens area of a single compartment lamp must be at least 37.5 cm$^2$ for a rear lamp and at least 22 cm$^2$ for a front lamp.

One specific regulation applies to the condition where the spacing of the turn signal is within 60 mm of the lighted edge of the low beam headlamp of the headlamp assembly. Automotive manufacturers have had to account for these various regulations when designing the headlamp assembly and turn signals of an automobile. Some of these solutions have involved placing the turn signal at a distance away from the headlamp so as to only have the turn signal produce the minimum required luminous intensity. However, due to the various styling demands of the consumer market, it is often desired to incorporate the turn signals at a location close to the headlamp assembly, necessitating the turn signal having the ability to meet the requirements for having two-and-a-half times minimum luminous intensity.

Accordingly, there exists a need for a turn signal assembly which can be located in close proximity to the headlamp assembly while still meeting various government regulations for luminous intensity.

SUMMARY OF THE INVENTION

The present invention is a headlamp assembly which includes an optic used for providing a turn signal which meets the government requirements for luminous intensity when the turn signal is located near or next to the headlamp assembly. The present invention is a headlamp assembly which includes a housing, at least one optic disposed within the housing, as well as at least one light source which is operable with the optic such that light is emitted from the optic which meets or exceeds present regulatory requirements. The present invention also includes an outer lens mounted on the housing such that light emitted from the optic passes through the outer lens.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a side view of a headlamp assembly incorporating an optic, according to the present invention;

FIG. 2 is an exploded view of a headlamp assembly incorporating an optic, according to the present invention;

FIG. 3 is a front view of a headlamp assembly incorporating an optic, according to the present invention;

FIG. 4 is a perspective view of an optic, according to the present invention;

FIG. 5 is an enlarged perspective view of two parabolic-shaped portions formed as part of an optic, according to the present invention; and FIG. 6 is a greatly enlarged view of part of a parabolic-shaped portion of an optic, according to the present invention.

DETAILED DESCRIPTION OF THE PREFERRED EMBODIMENTS

The following description of the preferred embodiment(s) is merely exemplary in nature and is in no way intended to limit the invention, its application, or uses.

A headlamp assembly incorporating an optic of the present invention used for a turn signal device is shown in the Figures generally at 10. The headlamp 10 includes an optic in the form of a light pipe 12 which is mounted in a housing 14. Also mounted in the housing 14 is a moving bezel 16 which is used for holding a plurality of optics (not shown). The plurality of optics is used in conjunction with light emitting diodes (LEDs, also not shown) for producing the low-beam and high-beams portions of the headlamp 10. There is also a fixed bezel 18 which surrounds the moving bezel 16 and the light pipe 12 when mounted in the housing 14.

Also connected to the housing 14 is a heat sink 20. The heat sink 20 absorbs heat produced in the headlamp 10. There is also an outer lens 22 where light is directed through and away from the headlamp 10 to illuminate the area in front of a vehicle.

Referring to FIGS. 4-6, the light pipe 12 also includes several parabolic-shaped portions 24. In this embodiment, there are five parabolic portions, but it is within the scope of the invention that more or less parabolic portions 24 may be used. The light pipe 12 also has an output surface 26, where light is directed through the output surface 26 in an area in front of the vehicle. In this embodiment, the output surface 26, as well as the rest of the width of the light pipe 12 is ten millimeters wide to produce a beam having a horizontal viewing angle of thirty degrees, but it is within the scope of the invention that other widths may be used as well to vary the horizontal viewing angle as desired.

The parabolic portions 24 also include side surfaces 28, the side surfaces do not emit light when the light pipe 12 is activated. The light pipe 12 also includes a notch, generally shown at 30, formed in each of the parabolic-shaped portions 24. Formed as part of each notch 30 are a first angled input surface 32, a second angled input surface 34, and an arcuate input surface 36. Located in close proximity to the input surfaces 32,34,36 is a light source, which in this embodiment is an LED, shown generally at 38. In addition to the side surfaces 28, the parabolic-shaped portions 24 also include a first parabolic surface, shown generally at 40, and a second parabolic surface, shown generally at 42. Each of the parabolic surfaces 40,42 include a plurality of flat surfaces 44 for directing light through the light pipe 12.

It can be seen in FIGS. 1-4 that the first parabolic surface 40 for the bottom four parabolic-shaped portions 24 does not extend all the way to the output surface 26; it can also be seen that the second parabolic surface 42 for top four parabolic-shaped portions 24 does not extend all the way to the output surface 26. Only the first parabolic surface 40 for the top parabolic-shaped portion 24 and the second parabolic surface 42 for the bottom parabolic-shaped portion 24 extend to the output surface 26. The reason for this is to allow the light from each of the LEDs 38 to blend together so as to present a smooth, continuous light output of the output surface 26.

The light pipe 12 incorporates the principles of total internal reflection (TIR) to maximize the efficiency of the light produced by the LEDs 38. The shape of the parabolic surfaces 40,42 along with the flat surfaces 44, combined with the fact that the side surfaces 28 do not emit light, as well as the light pipe 12 operating under the principles of TIR will ensure that the maximum amount of light produced by the LED 38 will exit only at the output surface 26. The TIR aspects of the light pipe 12 also help to provide maximum efficiency.

The light pipe 12 of the present invention is used for a turn signal in this embodiment. As shown in FIGS. 1 and 3, the light pipe 12 is located relatively close to the moving bezel 16. Certain regulations for the production of automobiles require specific levels of illumination for a turn signal lamp to prevent the beam produced by the turn signal lamp in a forward direction from becoming diluted by the low-beam pattern produced by a headlamp. These regulations are directed towards the condition where the turn signal lamp is manufactured to be located a specific distance from the portion of the headlamp which produces the low beam. For a turn signal located at a distance away from a headlamp, the current minimum requirement for the functional lighted lens area of a single compartment lamp must be at least 37.5 cm$^2$ for a rear lamp and at least 22 cm$^2$ for a front lamp. The light pipe 12 having the configuration described will produce light output which is two-and-a-half times higher than what is normally required of a turn signal lamp, meeting these requirements for when the turn signal is located less than 60 mm away from the headlamp.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A headlamp assembly, comprising:
    a housing;
    at least one total internal reflection (TIR) optic disposed within said housing;
    a plurality of light sources operable with said at least one optic such that light is emitted from said at least one optic substantially without loss of light intensity, and light emitted from said at least one optic is visible when said optic is located in proximity to a device producing a beam pattern from said headlamp assembly;
    an output surface formed as part of said at least one optic;
    a plurality of parabolic-shaped portions formed as part of said at least one optic, each one of said plurality of light sources is operable for delivering light to a respective one of said plurality of parabolic-shaped portions, and said plurality of parabolic-shaped portions culminate light such that light emitted from said output surface is of an increased intensity, and said output surface receives substantially all of the light produced by said plurality of light sources; and
    an outer lens mounted on said housing such that light emitted from said output surface of said at least one optic passes through said outer lens.

2. The headlamp assembly of claim 1, each of said plurality of parabolic-shaped portions further comprising:
    a first parabolic surface formed as part of said at least one optic;
    a second parabolic surface formed as part of said at least one optic such that light entering at least one optic from said at least one light source is directed toward said at least one output surface by said first parabolic surface and said second parabolic surface; and
    a notch for receiving light from said at least one light source, said notch being disposed between said first parabolic surface and said second parabolic surface.

3. The headlamp assembly of claim 2, further comprising a plurality of flat surfaces formed as part of each of said first parabolic surface and said second parabolic surface for directing light toward said at least one output surface.

4. The headlamp assembly of claim 2, said notch further comprising:
    a first input surface located in proximity to said at least one light source;
    a second input surface located in proximity to said at least one light source; and
    an arcuate input surface located in proximity to said at least one light source, said arcuate surface terminating into said first input surface and said second input surface such that substantially all the light emitted from said at least one light source is received by said first input surface, said second input surface, and said arcuate input surface.

5. The headlamp assembly of claim 1, said at least one optic further comprising at least two side surfaces.

6. The headlamp assembly of claim 1, wherein said at least one optic emits substantially all of the light produced by said at least one light source through the use of total internal reflection (TIR).

7. The headlamp assembly of claim 1, said at least one light source further comprising a light emitting diode (LED).

8. The headlamp assembly of claim 1, wherein light emitted from said at least one optic at an increased intensity is two-and-a-half times higher than a regulatory requirement with an illuminated lens area of 22.5 cm$^2$, when said headlamp assembly is used at the front of a vehicle.

9. A headlamp assembly for use in with a motor vehicle comprising:
    a housing;
    at least one total internal reflection (TIR) optic disposed within said housing;
    a plurality of light sources, said at least one optic operable for receiving substantially all of the light produced by said plurality of light sources, and said at least one optic is shaped such that light emitted from said at least one optic is visible when said at least one optic is located in proximity to a device producing a beam pattern;
    an output surface formed as part of said at least one optic;

a plurality of parabolic-shaped portions formed as part of said at least one optic, each one of said plurality of parabolic-shaped portions operable for receiving light produced by one of said plurality of light sources, and said plurality of parabolic-shaped portions are operable for producing light at said output surface of an increased intensity, and said output surface receives substantially all of the light produced by said plurality of light sources; and an outer lens mounted on said housing, such that light emitted from said output surface of said at least one optic passes through said outer lens.

10. The headlamp assembly of claim 9, each of said plurality of parabolic surfaces further comprising:
   a first parabolic surface;
   a second parabolic surface operable with said first parabolic surface for directing substantially all of the light in said at least one optic out of said at least one output surface; and
   a notch, wherein said first parabolic surface extends to said notch, and said second parabolic surface extends to said notch.

11. The headlamp assembly of claim 10, said at least one optic further comprising:
   a plurality of flat surfaces formed along said first parabolic surface and said second parabolic surface, said plurality of flat surfaces operable for directing light toward said at least one light output surface; and
   at least two side surfaces substantially perpendicular to said plurality of flat surfaces.

12. The headlamp assembly of claim 10, said notch further comprising:
   a first input surface, said first parabolic surface terminating into said first input surface;
   a second input surface, said second parabolic surface terminating into said second input surface; and
   an arcuate surface, said first input surface terminating into said arcuate surface and said second input surface terminating into said arcuate surface such that substantially all of the light produced by said at least one light source is delivered to said first input surface, said second input surface, and said arcuate surface.

13. The headlamp assembly of claim 9, wherein said at least one light source is a light emitting diode (LED).

14. The headlamp assembly of claim 9, wherein said at least one optic directs light out of said at least one optic through the use of total internal reflection (TIR).

15. The headlamp assembly of claim 9, wherein light emitted from said at least one optic at an increased intensity is two-and-a-half times higher than a regulatory requirement with an illuminated lens area of 22.5 cm$^2$, when said headlamp assembly is used at the front of a vehicle.

16. A plurality of parabolic-shaped portions formed as part of an optic disposed within a housing of a headlamp assembly, each of said parabolic-shaped portions comprising:
   at least one output surface for receiving light from all of said plurality of parabolic-shaped portions;
   a first parabolic surface operable for directing light out of said at least one output surface;
   a second parabolic surface operable for directing light out of said at least one output surface;
   a notch, said first parabolic surface terminating in said notch, and said second parabolic surface terminating in said notch;
   a light source operable with said notch for delivering light to said optic such that substantially all of the light produced by said light source exits said optic out of said at least one output surface through the use of total internal reflection (TIR), and the light emitted from said optic is visible when said optic is located in proximity to a device in said headlamp assembly that produces a beam pattern; and
   at least two side surfaces substantially perpendicular to said first parabolic surface and said second parabolic surface;
   wherein said at least one output surface of each of said plurality of parabolic-shaped portions emits light through an outer lens mounted to said housing.

17. The plurality of parabolic-shaped portions formed as part of an optic of claim 16, said notch further comprising:
   a first input surface located in proximity to said light source;
   a second input surface, located in proximity to said light source; and
   an arcuate surface extending to both of said first input surface and said second input surface such that substantially all of the light produced by said light source is directed to said first input surface, said second input surface and said arcuate input surface.

18. The plurality of parabolic-shaped portions formed as part of an optic of claim 16, further comprising a plurality of flat surfaces formed on both of said first parabolic surface and said second parabolic surface.

19. The plurality of parabolic-shaped portions formed as part of an optic of claim 16, said headlamp assembly further comprising:
   a moving bezel disposed within said housing in proximity to said optic;
   a fixed bezel surrounding said moving bezel and said optic;
   said outer lens is connected to said housing such that as light passes through said at least one output surface, light will also pass through said outer lens; and
   a heatsink connected to said housing to remove heat produced by said optic.

20. The plurality of parabolic-shaped portions formed as part of an optic of claim 16, said light source further comprising a light emitting diode (LED).

21. The plurality of parabolic-shaped portions formed as part of an optic of claim 16, wherein light emitted from said at least one output surface of said at least one optic at an increased intensity is two-and-a-half times higher than a regulatory requirement with an illuminated lens area of 22.5 cm$^2$, when said headlamp assembly is used at the front of a vehicle.

* * * * *